United States Patent [19]

Takahashi

[11] Patent Number: 4,865,363
[45] Date of Patent: Sep. 12, 1989

[54] PIPE CONNECTION DEVICE FOR SCIENTIFIC EQUIPMENT

[75] Inventor: Kazutomo Takahashi, Ichikawa, Japan

[73] Assignee: Kyoshin Industries Co., Ltd., Tokyo, Japan

[21] Appl. No.: 245,665

[22] Filed: Sep. 9, 1988

[30] Foreign Application Priority Data

Sep. 11, 1987 [JP] Japan .................. 62-226640

[51] Int. Cl.$^4$ .................. F16L 19/06
[52] U.S. Cl. .................. 285/323; 285/348; 285/356
[58] Field of Search .......... 285/207, 356, 323, 348, 285/354

[56] References Cited

U.S. PATENT DOCUMENTS

| | | | |
|---|---|---|---|
| 2,412,664 | 12/1946 | Wolfram et al. | 285/354 X |
| 2,613,086 | 10/1952 | Wolfram | 285/348 X |
| 3,074,747 | 1/1963 | Boughton | 285/348 X |
| 3,733,093 | 5/1973 | Seiler | 285/356 X |
| 4,235,461 | 11/1980 | Normark | 285/354 X |
| 4,431,216 | 2/1984 | Legris | 285/323 X |

FOREIGN PATENT DOCUMENTS

| | | | |
|---|---|---|---|
| 271367 | 5/1964 | Australia | 285/323 |
| 2415699 | 10/1975 | Fed. Rep. of Germany | 285/343 |
| 1554874 | 1/1969 | France | 285/343 |
| 60-191789 | 12/1985 | Japan . | |
| 62-73187 | 5/1987 | Japan . | |
| 62-147784 | 9/1987 | Japan . | |
| 379413 | 9/1932 | United Kingdom | 285/323 |

Primary Examiner—Thomas F. Callaghan
Attorney, Agent, or Firm—Fleit, Jacobson, Cohn, Price, Holman & Stern

[57] ABSTRACT

A pipe connection device for a scientific equipment in which a reduced diameter head having slits is formed at a front end part of a clamp covering a packing fitted to an outer circumference of the open end part of the pipe. A part of the packing is positioned within the reduced diameter head. The reduced diameter head, at its extremity end, forms an inclined cylinder part fitted to an inner inclined surface of the fixed screw and also forms a cylinder part to which a pressing ring is engaged and fitted adjacent to the inclined cylinder part. The reduced diameter head is reduced in its diameter by the inner inclined surface under screwing of the fixed screw. The pressing ring, formed to have a slightly smaller diameter than an outer diameter of the cylinder part, is pressed against an open end surface of the inner inclined surface. The pressing ring is raised up over the inclined cylinder part and press fitted onto the cylinder part.

1 Claim, 2 Drawing Sheets

PIPE CONNECTION DEVICE FOR SCIENTIFIC EQUIPMENT

TECHNICAL FIELD

This invention relates to a pipe connection device for scientific equipment for use in supplying fluid so as to perform an analysis and, more particularly to a device for connecting a pipe to a communication hole of a connector base body so as to prevent a leakage of applied fluid.

BACKGROUND OF THE INVENTION

In the conventional type of pipe connection, there has been provided, as disclosed in Jap. U. M. Appln. No. 59-78625 and Jap. U. M. Appln. No. 60-165113 filed by the present applicant, a device in which a contact member, for slightly varying its volume under pressing of a screw member, is closely contacted with an outer circumferential surface of a pipe inserted and fixed to a connection part of a base body to make a connection of the pipe to the base body so that leakage of fluid passing through the pipe is prevented. However, such a pipe connection was still unstable only with the deformation of the conventional contact member, which resulted in minute clearances between both members sometimes causing a leakage of fluid and trouble in connection between the base body and the pipe.

In view of the above, the present applicant has proposed a new and improved pipe connection device in Jap. U. M. Appln. No. 61-34552 as a device for improving the above-mentioned problems. This device relates to a pipe connection device for scientific equipment wherein an open end of a pipe supporting a fixed screw is connected to a through-hole of a connection base member through a screwing of said fixed screw; a reduced diameter head having slits therein is formed at a front end of a clamp member covering a packing fitted to an outer circumference of the pipe to cause a part of the packing to be located within the reduced diameter head; and the extremity end of the reduced diameter head is provided with an inclined surface fitted to an inner inclined surface of said fixed screw.

In each of the above-mentioned devices, it sometimes happened that some auxiliary connection members such as a clamp or a packing etc. are left within the connection base body when the fixed screw is loosened and the pipe is pulled out of the connection base member for the sake of its maintenance or inspection or cleaning etc. A troublesome results problem, in that a taking-out of these members must be additionally performed.

Therefore, it is an object of the present invention to provide a pipe connection device for a scientific device in which said connection auxiliary members can be taken out together with the pipe and at the same time a more positive pipe connection than the connection device of the above-mentioned Jap. U. M. Appln. No. 61-34552 can be obtained.

Other objects, features and effects of the present invention will become more apparent in reference to the following description related to the attached drawings illustrating one preferred embodiment of the present invention.

SUMMARY OF THE INVENTION

This invention relates to a pipe connection device for scientific equipment in which a reduced diameter head having some slits is formed at a front end of a clamp enclosing a packing fitted to an outer circumference of an open end of a pipe. A part of said packing is positioned within said reduced diameter head. The reduced diameter includes an inclined cylinder fitted to an inner inclined surface of the fixed screw at its extremity end and a cylinder part onto which a pressing ring is engaged and fitted adjacent to the inclined head. The reduced diameter head is reduced at its diameter under a screwing of the fixed screw; and further, the pressing ring having its diameter slightly more reduced than an outer diameter of said cylinder part is pressed to the open end surface of the inner inclined surface. The pressing ring is raised up over said inclined cylinder part and press fitted onto the cylinder part.

DESCRIPTION OF THE PREFERRED EMBODIMENT

Figure 3:
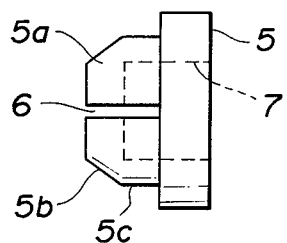
FIG. 3 is a side elevational view for showing a clamp.
Figures 5, 6:
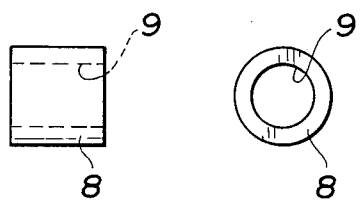
FIG. 5 is a side elevational view for showing a packing.
FIG. 6 is an end view for showing the packing of FIG. 5.
Figure 4:
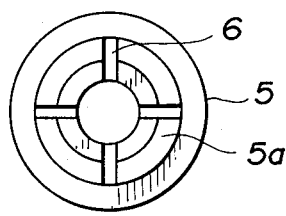
FIG. 4 is a left end view for showing the clamp of FIG. 3.
Figure 7:
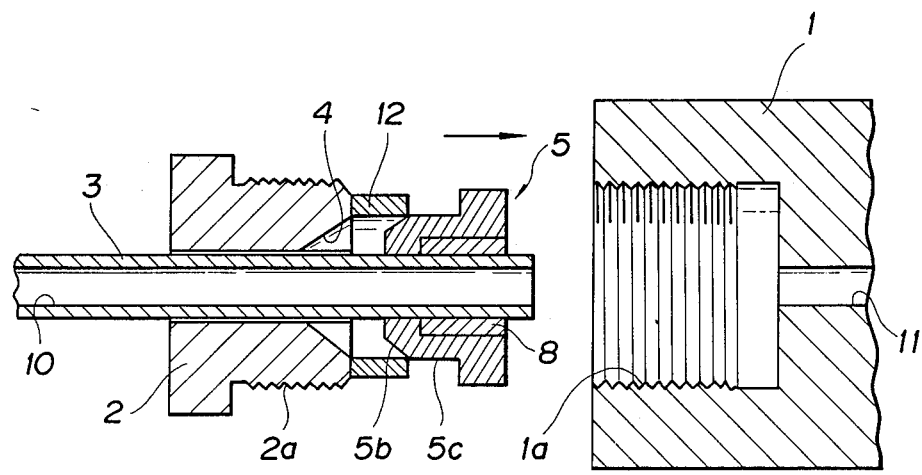
FIG. 7 is an exploded longitudinal sectional view for showing a condition of said preferred embodiment of the present invention before connection.

Referring now to the drawings, one preferred embodiment of the present invention will be described. As shown in FIG. 7, when an inner opened end of a pipe 3 having a central hole 10 which has the same diameter as that of a through-hole 11 pierced at a center of a connection base body 1 is connected to said through-hole 11, at first the fixed screw 2 and the pressing ring 12 are fitted onto the pipe 3 from its inner end side, then a packing 8, having an inner diameter 9, made of flexible material and fitted onto an outer circumference of the pipe 3 (see FIGS. 5 and 6) and the clamp 5 having said packing 8 enclosed therein are fitted along an outer circumference of the inner open end of said pipe 3. The clamp 5 is formed with an inner cavity 7 adapted to cover said packing 8 therein as shown in FIGS. 3 and 4 and at the same time a reduced diameter head 5a is integrally arranged at the front part of said clamp 5. The reduced diameter head 5a is formed at its extremity end with an inclined cylinder 5b and at its rear end with a cylinder part 5c, respectively, and said reduced diameter head 5a is formed with proper number of slits 6.

The inner vacant part 7 is bored to reach up to a part of said reduced diameter head 5a from the flange side of the clamp 5, then the packing 8 is stored in it and said pressing ring 12 has an inner diameter slightly smaller than the outer diameter of the cylinder part 5c of said clamp 5.

The fixed screw 2 for use in connecting the connection base body 1 to the pipe 3 is provided, at an inner end of the screw cylinder formed with an outer threaded part 2a at its outer circumference with a funnel type inner inclined surface 4 fitted to the inclined cylinder part 5b of said clamp 5.

The inner threaded part 1a made at the inner connector wall of said connection base body 1 is threadably engaged with said outer threaded part 2a of the fixed screw 2. When the extremity end of the pipe 3 is inserted into the inner threaded part 1a under the condition shown in FIG. 7 and said inner threaded part 1a and said outer threaded part 2a are threadably engaged with each other, the pressing ring 12 is pressed axially by the extremity end surface of said fixed screw 2 and raised up along the inclined cylinder 5b and press fitted onto the cylinder part 5c. The inner inclined surface 4 of the fixed screw 2 is contacted with the inclined cylinder part 5b of said clamp 5 as the fixed screw is screwed into the member to cause the reduced diameter head 5a to be reduced in its diameter by the slits 6. Simultaneously, the covered packing 8 applied in the inner vacant part 7 is closely fitted to the surface of the pipe 3.

Figure 1:
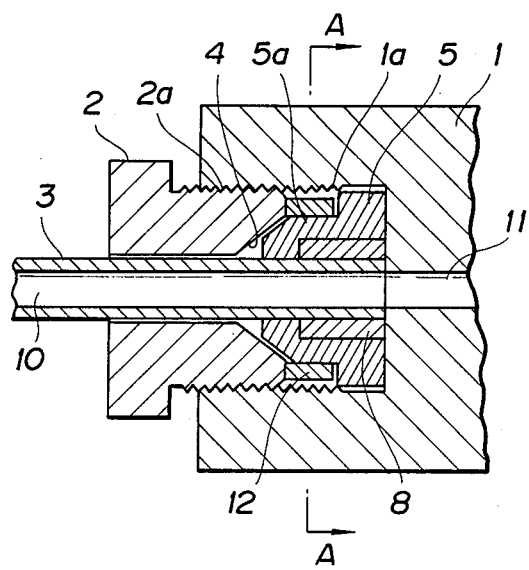
FIG. 1 is a longitudinal sectional view of a substantial part of one preferred embodiment of the present invention under its connected condition.
Figure 2:
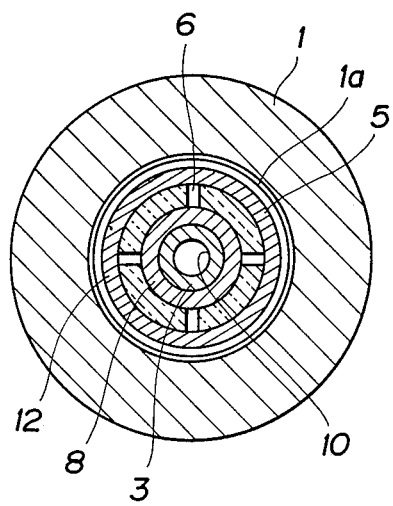
FIG. 2 is a cross sectional view taken along a line A—A of FIG. 1.

Upon completion of connection as shown in FIGS. 1 and 2, the reduced diameter head 5a having its diameter reduced with the inner inclined surface 4 of the fixed screw 2 depresses the surface of the pipe 3 directly and through the packing 8 to cause said pipe 3 to be abutted against the connection base body 1 and at the same time the above-mentioned connection becomes more positive with the pressing ring 12 press fitted onto the circumferential part 5c of the reduced diameter head 5a.

Figure 8:
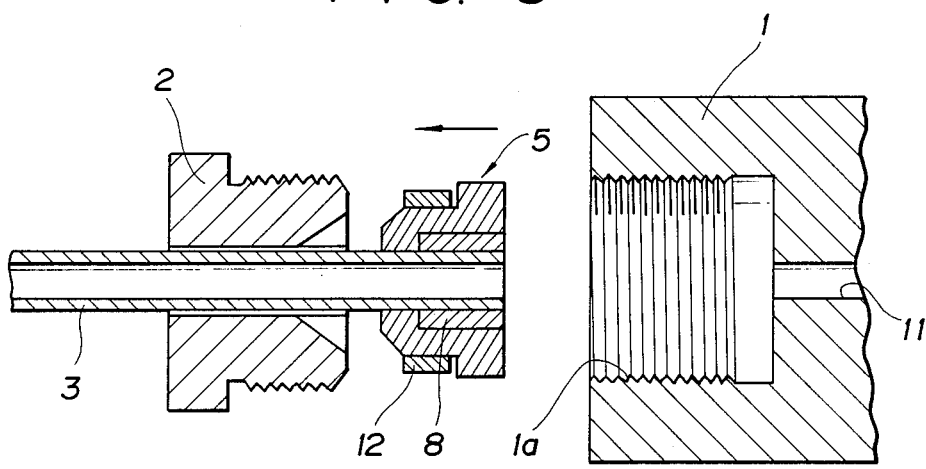
FIG. 8 is an exploded longitudinal sectional view for showing a removed condition after the connection of said preferred embodiment of the present invention.

Therefore, when the device is to be disassembled for the purpose of repair and maintenance or cleaning, the fixed screw 2 is removed as shown in FIG. 8 and then the pipe 3 is pulled out of the connection base body 1, resulting in that said clamp 5, packing 8 and pressing ring 12 can be easily pulled out from the inner threaded part 1a while they are integrally assembled together.

As apparent from the above-mentioned preferred embodiment, in the present invention, when the fixed screw 2 is screwed in with respect to the connection base body 1, the inner inclined surface 4 of said fixed screw 2 causes the reduced diameter head 5a of the clamp 5 fitted to the outer circumference of the inner opened end of the pipe 3 to be reduced along with the slits 6, simultaneously causes the covered packing 8 to be close fitted to the outer circumference of the pipe 3 and so it is possible to make a positive fixing of the connection of the pipe 3 with respect to the through-hole 11 of the connection base body 1 in order to prevent fluid passing through the pipe 3 from being leaked out of the connection part.

When the fixed screw 2 is screwed into the base body, the opened end surface of the inner inclined surface 4 presses against the pressing ring 12, said pressing ring 12 is press fitted onto the inner cylinder part 5c of the clamp 5 to secure a close fitted connection between the packing 8 and the pipe 3 due to the clamp 5 of the reduced diameter head 5a. On the other hand, since they can be integrally removed, their repair and maintenance as well as cleaning may easily be performed.

In the present invention, various modifications and applications could be made without departing from the technical spirit of the invention, so that its scope is limited only by the description of the following claim.

The scientific equipment described is specifically physical and chemical equipment.

What is claimed is:

1. A pipe connection device for scientific equipment comprising:
   a pipe having an open end part,
   a fixed screw for disposal around said pipe to support said open end part,
   a connection base body to which said fixed screw can be connected by screwing said fixed screw into a recess in said connection base body,
   a clamp, including a reduced diameter head having slits formed at a front end part of said clamp,
   a packing fitted to an outer circumference of said pipe adjacent said open end part of the pipe, said packing covered by said clamp, at least part of the packing being positioned within a cavity formed in said reduced diameter head,
   an inclined cylinder part, formed at an extreme end of said reduced diameter head, contacting an inner inclined surface of said fixed screw as said fixed screw is screwed into said recess in said connection base body, said reduced diameter head also forming a cylindrical part adjacent to said inclined cylinder part, said reduced diameter head being decreased in its diameter upon contact with the inner inclined surface of said fixed screw as the fixed screw is screwed into said recess in said connection base body,
   a pressing ring having a slightly smaller diameter than an outer diameter of the reduced diameter head before the diameter of said reduced diameter head is decreased, said pressing ring being pressed against an end of said inner inclined surface, so that said pressing ring slides along said inclined cylinder part and is raised up over said inclined cylinder part and press fitted onto the cylindrical part as the diameter of said reduced diameter head is decreased to force said packing into tight engagement with said pipe.

* * * * *